United States Patent [19]

Lin et al.

[11] Patent Number: 5,234,964
[45] Date of Patent: Aug. 10, 1993

[54] MICROCELLULAR POLYURETHANE ELASTOMERS

[75] Inventors: Nai W. Lin, Rochester Hills; Roland G. Jaber, Sterling Heights; Brian Fogg, Rochester Hills, all of Mich.

[73] Assignee: Imperial Chemical Industries PLC, London, England

[21] Appl. No.: 827,243

[22] Filed: Jan. 28, 1992

[30] Foreign Application Priority Data

Jan. 29, 1991 [GB] United Kingdom ................. 9101862

[51] Int. Cl.$^5$ ............................................. C08G 18/14
[52] U.S. Cl. ...................... 521/99; 521/106; 521/120; 521/122; 521/123; 521/159
[58] Field of Search ............... 521/99, 106, 120, 122, 521/123, 159

[56] References Cited

U.S. PATENT DOCUMENTS

| | | | |
|---|---|---|---|
| 4,116,893 | 9/1978 | Flanagan | 521/137 |
| 4,240,950 | 12/1980 | von Bonin et al. | 521/127 |
| 4,243,755 | 1/1981 | Marx et al. | 521/99 |
| 4,282,329 | 8/1981 | von Bonin et al. | 521/99 |
| 4,288,564 | 9/1981 | Conover et al. | 521/123 |
| 4,882,363 | 11/1989 | Neuhaus et al. | 521/122 |
| 4,968,724 | 11/1990 | Mascioli | 521/103 |

FOREIGN PATENT DOCUMENTS 1285224 8/1972 United Kingdom .

OTHER PUBLICATIONS

Clatty, J. L. R. and Harasin, S. J., "Performance of Alternate Blowing Agents to Chlorofluorocarbons in RIM Structural and Elastomeric Polyurethane Foams", 32nd Annual Polyurethane Technical/Marketing Conference, Oct. 1–4, 1989, pp. 634–637.

Primary Examiner—Maurice J. Welsh

[57] ABSTRACT

Microcellular polyurethane elastomers having nonpeelable skin surfaces having densities ranging from 0.1–1.1 gm/cm$^3$ can be made from conventionally employed reactants using carbon dioxide gas as the sole source of blowing agent resulting from the $H_2O$/-NCO reaction when carried out in an admixture with nonhydratable particulate inorganic salts.

12 Claims, No Drawings

MICROCELLULAR POLYURETHANE ELASTOMERS

This invention relates to the manufacture of microcellular polyurethane elastomers having wide application in the footwear and automotive industries. In particular it is directed to an elastomer foam having improved closed cell structure and substantially nonporous surface. Specifically, it is directed to an improved method of manufacture which employs carbon dioxide gas as the sole blowing agent generated by a water-/isocyanate reaction in the presence of certain particulate inorganic salts. The invention also includes polyurethane forming reactants containing said particulate salts.

The traditional method for making integral skin polyurethane foam involves using about 4.53 kg (10 lbs) of chlorofluorocarbon blowing agent per 45.3 kg (100 lbs) of foam. Nearly all the chlorofluorocarbon used as blowing agent escapes to the atmosphere. Due to concerns for the depletion of the ozone layer in the stratosphere and the phase out of the use of chlorofluorocarbons (CFC) mandated by the Montreal Protocol, the use of the water/isocyanate reaction to generate $CO_2$ has become attractive as a means for solving this atmospheric pollution problem.

Until now however use of the $NCO/H_2O$ reaction to generate carbon dioxide blowing gas has been unsatisfactory in that the elastomeric products formed have a slightly porous skin surface as well as an undesirable open cell core structure which detracts from the toughness and wear characteristics needed for most end use applications. With water generated $CO_2$ blowing it has been nearly impossible to form products having clean looking blemish free surfaces without sink or shrink marks and visible cream lines. Such imperfections make printing of the part difficult. Furthermore, CFC blown foams have skin surfaces which are somewhat more easily peeled off.

Surprisingly, it has been discovered that the $H_2O/$-NCO reaction can be employed as the primary blowing agent to produce improved integral skin closed cell polyurethane foam elastomers having densities ranging from 0.1-1.1 gm/cm$^3$ with nonpeelable skin thicknesses ranging from 0.5-3 mm.

Therefore the invention is concerned with a process for the manufacture of a microcellular polyurethane elastomer product having a density in the range of 0.1 to 1.1 gm/cm$^3$ produced by reacting a polyisocyanate, a polyol and a chain extender and a blowing agent, the improvements which comprises employing carbon dioxide gas as the sole source of the blowing agent resulting from the reaction of water with isocyanate in admixture with particulate, water-insoluble, nonhydratable inorganic salts.

The foams of the invention are characterize by cross section analysis employing scanning electron microscopy as having relatively uniform closed cell pore size distribution with a dense nonporous skin surface. The pore diameter in the skin area (1-2 mm from the mold surface) has a pore or cell size ranging from 15-50 microns in cross section while that at the midsection of the moulded article (core area) has a pore or cell size distribution ranging from 30-80 microns in cross section. The pore size distribution changes gradually from core to skin with no sharp distribution or density change. The electron photomicrographs having magnifications ranging from 40 to 400 indicate that at the core no one cell or pore connects with more than about 4 adjacent cells, while those at the skin area interconnect with no more than 2 cells. Said interconnects are less than about 5 microns in diameter. It is this closed cell structure which essentially distinguishes the product over that made conventionally using chlorofluorocarbons as the blowing agent either alone or in combination with water and which accounts for the nonpeelable skin. The invention especially provides for improved microcellular polyurethane elastomers having a density in the range of 0.25 gm/cm$^3$ to 0.95 gm/cm$^3$ which is characterized by cells of cross section dimensions in the core area ranging from 30-80 microns in open cross section and in the skin region from 15-50 microns in open cross section to produce a resultant hardness (SHORE A) in the skin region of 50-60 and at the core region of 22-25. Improvements in ROSS flex, BATA flex and TABOR abrasion loss are realized with the products having the above described microcellular shape and cross section distribution.

The elastomer products according to the present invention, such as moulded integral skin articles for example unit shoe soles, automotive parts such as steering wheel pads, crash pads and seating components such as armchair covers and the like can be moulded from conventionally employed reactants using carbon dioxide gas as the sole source of blowing agent resulting from the $H_2O/$-NCO reaction. Inorganic metal salts contemplated for use in the invention are selected from non-hydratable, water insoluble salts of metals selected from groups IIA, III-A, IV-B, V-B, VI-B, VII-B and VIII-B of the Periodic Table of elements, tin, lead, antimony and bismuth, such cations may be combined with anionic components such as halogen, sulfates, phosphates, biphosphates, carbonates, oxides, chromates, silicates, molybdates and the like. Double salts of these components with Group I of the Periodic Table may also be employed. Operable salts include: $BaSO_4$; $BaCO_3$; $BaCrO_4$; $Ba_3(PO_4)_2$; $BaMoO_4$; $CaF_2$; $PbCrO_4$; $Ag_2CO_3$; $AgCN$; $SrSO_4$; $Ca_3(PO_4)_2$; $KAl_2(AlSi_3O_{10})(OH)_2$; $MgSiO_3$; $Mg_2SiO_4$; $SrCO_3$; $Sr_2SiO_4$ and mica. Salts having a solubility of less than 0.01 parts per 100 parts water at 25° C. are operable.

Even though these salts do not form hydrates and are extremely insoluble in water they can be employed advantageously in the case where surface hydroxyls are available through the surface adsorption of water molecules. For example, when barium sulfate is employed in combination with water, it is believed that water is absorbed via a hydrogen-bonding interaction with oxygen atoms in exposed sulfate anions to form available hydroxyl groups. This adsorption is thought to moderate cell size and uniformity and cellular interconnects. It is also believed that some of the carbon dioxide generated is adsorbed on the surface of the salts in the form of carbonate ions thus further reducing the cellular interconnects. Particulate salts may range in particle size from 0.5 to 1000 microns.

In the practice of the invention the above-described metal salts may be dispersed in an appropriate amount of water to provide a sufficient volume of gas necessary to form a microcellular foam. The weight ratio of the anhydrous salt to total water may range from 1-100. The mol ratio of $-NCO/H_2O$ in the polyurethane foaming system may range from 2-60. The quantity of salt in the resin mix may range from 0.5-20 parts per 100 parts total resin with 3-8 parts most preferred.

In manufacturing the foams of the invention a normally liquid "A"-component comprising an isocyanate terminated polyether prepolymer is blended with a "B"-component comprising a polyether polyol, a chain extender, a catalyst, water, and optional coloring agent, surfactants, mold release agents, dyes, fillers and plasticizers. The metal salt may be added with either the A or B components or both.

The polyisocyanates used in the preparation of the normally liquid quasi-polyetherprepolymers are made by reacting diphenylmethane diisocyanate (MDI) in particular 4,4' and/or 2,4'-diphenylmethane diisocyanate which are solid at room temperature plus minor quantities of a carbodiimide of MDI or mixtures thereof and/or a corresponding uretonimine triisocyanate of MDI. In addition to the prepolymers may be included additional conventional aromatic polyisocyanates.

The normally liquid polyisocyanate terminated prepolymer having a crystallization point below about 13° C. desirably below 10° C. and preferably below 5° C. generally no lower than about −20° C. is prepared by reacting a mixture of the above described polyisocyanate with an ethylene oxide capped polyol such as poly(oxyethyleneoxypropylene) polyols and polymeric poly(oxyethyleneoxypropylene) polyols or mixtures thereof. These polyether polyols have a hydroxyl equivalent weight of 750 to 3000 and preferably from 850 to 2500 and a hydroxyl functionality of 2 to 3 desirably 2 to 2.6 and preferably about 2.3. These materials are made by reacting propylene oxide with a polyol having 2 to 3 hydroxyl groups to provide a polyether polyol and thereafter with ethylene oxide to form a polyoxyethylene cap representing 10–30% by weight of the total polyol when fully reacted.

The prepolymers are prepared by mixing MDI with polyether polyols by conventional means in the presence of well known catalysts which promote the reaction of isocyanate with hydroxyl groups under heating and stirring. Excess polyisocyanate is provided in the reaction mixture to provide an unreacted NCO content of 18–25% corresponding to -NCO equivalent weight in the range of 233.8–168.4.

Liquid ethylene oxide capped polyols used as a co-reactant in the "B"-component are characterized by a hydroxy equivalent weight of 750 to 3000, preferably from 850 to 2500 and usually in the range of 1000 to 2250 and a hydroxy functionality of 2-3, preferably 2.1-2.3. Polyester polyols having a similar hydroxy equivalent weight are also operable.

Chain extenders, employed in the B-component, preferably have a molecular weight below 500 and hydroxyl groups and/or hydrogen containing amino groups. Illustrative of such chain extenders are those having the formula $HO(CH_2)_nOH$ wherein n is 2–10, for example ethylene glycol, 1-3-propane diol, 1,4-butane diol, 1,5-pentane diol, 1,6-hexane diol, 1,10-decane diol and the like. Other glycols which are suitable include diethylene glycol, thiodiglycol, triethylene glycol, tetraethylene glycol and paraxylenediol, quinitol, neopentaleneglycol, dihydroxyethyl hydroquinone and mixtures thereof. Chain extenders containing active hydrogens on amine and hydroxyl groups may also be employed; e.g. N-methyldiethanolamine, N-t-butyldiethanol amine, di-beta-hydroxyethylaniline, tri-isopropanolamine, 2-butene-1,6-diol, 2,3-dibromo, 1,4-butanediol, di-beta-hydroxyethylurea and di-beta-hydroxyethyl urethane. Minor amounts of higher functional compounds such as trifunctional compounds can be admixed with the difunctional chain extenders and include glycerine, trimethol propane, trimetholethane, 1,2,6-hexane-triol and others known in the art.

Catalysts which can be employed for the purpose of accelerating the chemical reaction rates during the preparation of the microcellular elastomers include, by way of illustration, the following:

(a) tertiary amines such as bis(dimethylaminoethyl)ether;

(b) tertiary phosphines such as trialkylphosphines, dialkylbenzylphosphines, and the like;

(c) strong bases such as alkali and alkaline earth metal hydroxides, alkoxides and phenoxides;

(d) acidic metal salts of strong acids such as ferric chloride, stannic chloride, stannous chloride, antimony trichloride, bismuth nitrate and chloride, and the like;

(e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenedimines, salicyclaldehydeimine, and the like, with various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like;

(f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino) alkanols, such as the well known chelates of titanium obtained by said or equivalent procedures;

(g) salts or organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Dialkyltin mercaptides may also be utilized. Similarly there may be used trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin chloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in catalytically significant quantities, for example, from about 0.001 percent to about 2 percent, based on weight of the reaction mixture.

Further additives which may be used include surface active agents, cell regulating agents, stabilizers, dyes, and the like.

Examples of suitable emulsifiers include the sodium salts of castor oil sulphonates or salts of fatty acids with amines, such as diethylamine oleate or diethanolamine stearate. Alkali metal or ammonium salts of sulphonic acids, for example, of dodecylbenzenesulphonic acid or dinaphthylmethane-disulphonic acid, or of fatty acids, may also be used as surface active additives.

Suitable foam stabilizers include polyether siloxanes, especially those which are water-soluble. These compounds are generally synthesized in such a way that a copolymer of ethylene oxide and propylene oxide is attached to a polydimethylsioxane radical. Foam stabilizers of this type are described, for example, in U.S. Pat. No. 2,834,748; 2,917,480; and 2,629,308.

Cell regulating agents which are useful include the polydimethylsiloxanes having viscosities of from about 2 to about 1000 centistokes at 25° C.; polyphenylmethylsiloxanes like the products described in U.S. Pat. No. 4,042,537; mineral oils, polyether polyols comprising copolymers and block copolymers of ethylene and propylene oxides; and the like. Such polyether polyols can be linear or branched copolymers and block copolymers having molecular weights of, for example, from 1000 or lower to 6000 or higher. The preferred polyether polyols are linear copolymers and block copolymers having molecular weights of from about 2000 to about 3500. They can be utilized in proportions from 1 to as high as 20 parts per 100 parts of the polyol. Preferred cell regulating agents are the polydimethylsiloxanes having viscosities of from about 5 to about 20 centistokes at 25° C. Examples of these products include DC 200 fluids (available from Dow Corning Corporation), having viscosities of from about 5 to about 100 centistokes at 25° C., and also Dow Corning Fluid DCF-1-1630, having a viscosity of about 3.5 centistokes at 25° C. (the viscosity being an indicator of the molecular weight of these silicon fluids). DC 200 fluid 5 cs has a molecular weight of 680, 10 cs oil corresponds to 1000 MW, 20 cs to 1600 MW, 50 cs to 3200 MW, and 100 cs to 5000 molecular weight (MW).

In the utilization of the present invention to manufacture integral skin microcellular polyurethane elastomeric articles, such as shoe soles, an aspect which is highly preferred, either of two commonly employed sole making processes are satisfactory. In one process, the left and right foot soles are cast as unit soles, removed from the cast, and then attached to the shoe uppers by a suitable adhesive. In the other process, the shoe uppers, i.e., left and right foot, are presented as one mold surface and the formulation is injected into the mold cavity defined by the shoe uppers and the mold walls. In either case, the molds are closed wall molds so as to obtain the mold defined sole shape. This sole shape may not necessarily be smooth and may have built-in mold ridges such as for resiliency, cushioning, lugs for slip resistance, etc.

In either process, the typical adhesives (also called "cements") for attaching (also called "cementing") the soles to the uppers are well known. In the second process, i.e., the direct attachment, the adhesive adhesive may be the cast polyurethane minus the blowing agent which is curved with the cast foam as it cures, or it may be a different polyurethane adhesive.

In the manufacture of integral skin microcellular elastomer articles, e.g., shoe soles, typically the multi-component system is employed. Component "A" contains the normally-liquid quasi-polyether polyisocyanate prepolymer and Component "B" contains a compatable blend of polyether polyol, chain extender, the metal salt and other additives. A further Component "C" may contain such additives as pigments, cell regulating agent, plasticizer, etc., as in a three component system. Though the shoe manufacturer does the actual metering, mixing and dispensing of the materials on the premises, the multicomponent system, tailored to meet the manufacturer's requirements, is often times purchased by the manufacturer or finished unit soles and/or shoes from the systems supplier.

The microcellular elastomeric products are characterized by the following properties: a density of 0.25-0.9 gm/cc; a SHORE A hardness of at least 50, skin area and at least 10 in the core area as determined by ASTM-2230; 0% cut-growth ($-20°$ C.) at 100M cycles, (ASTM-1052); excellent growth strength at a demold time of 2.5 minutes characterized in that said integral skin microcellular product in the form of a 6 inch $\times$ 8 inch $\times$ 0.25 inch moulded plaque is capable of withstanding a 180° bend without development of visual surface cracks at the bend of said placque; Tabor abrasion loss at 5000 cycles of less than 500 mg, preferably less than 100 mg (ASTM-D3389); a resilient microcellular core of substantially uniform density and a strong closed cell structure integrally formed with said skin structure having a tough nonpeelable continuous surface skin, the core and the skin area being characterized by a gradual change in density, and said skin area having an average thickness in the range of 0.5-3 mm preferably about 1-2 mm.

DESCRIPTION OF TEST METHODS

The following test methods have been used to determine physical properties. The description found in the appropriate ASTM manual applies except as noted below:

Tear Strength: ASTM D-624. Die C.

Tensile Strength and Elongation: ASTM D-412. Method A.

Flex Testing: ASTM D-1052

TABOR Abrasion Loss: determined in accordance with ASTM-D-3389, test equipment of Tabor Instrument Co., North Tonawanda, N.Y. A specimen of the novel integral skin microcellular elastomer in the shape of a disc ($4\frac{1}{2}$" in diameter and $\frac{1}{4}$" or $\frac{1}{8}$" thickness) is first conditioned (pre-abraded) for 1000 cycles at room temperature using Wheel H-18. The specimen is then cleaned of abraded particles, weighed, again subjected to abrasion for 5000 cycles at room temperature using Wheel H18. The abraded material is weighed and expressed as milligrams (mg) of specimen loss through the abrasion operation. The cycle speed of the wheel is $70+1$ revolutions per minute. A vertical force or weight of 1000 grams is imposed on the arm of the abrader.

Hardness: ASTM D-2240, Durometer Shore A.

Preparation of foams

Hand foams are prepared by weighing all the ingredients of the polyol component (e.g. polyol(s), extender(s), surfactants(s), catalyst(s), blowing agent(s), etc.) as required, into a polyethylene linked paper cup. These ingredients are then mixed well. The required amount of quasi-prepolymer is then added into the polyol component and mixed at high speed for 8 to 10 seconds. The mixture is then cast into a clean cup or a mold as required.

In the tables herein, the following terms of art which are being used are defined below:

Cream Time: The time interval between the beginning of mixing and the point at which the mixture turns creamy or cloudy and starts to expand.

Rise Time: The time interval between the beginning of mixing and the completion of expansion of the foaming mass.

Tack Free Time: The time interval between pouring the liquid mixture and the time that the surface of the foam can be touched with a finger without sticking.

Snap Time: When the reacted polymer can no longer be separated when pinched between two fingers and pulled.

Free Blowing Density: The density in g./cm$^3$ of a foam that is allowed to rise in an open cup and is determined by cutting the cap of the foam flush with top of the cup and using the following equation:

Weight of foam and cup in gms −

$$\frac{\text{Weight of cup in gms}}{\text{Volume of cup in cc}} = \text{gm/cc}$$

Molded Density: The moulded density is expressed in terms of grams per cubic centimeter (gm/cc.), and is measured on the moulded item by means of volume displacement with a liquid.

Inasmuch as a number of components employed in the practice of the invention have been identified by their trademark or trade names, for the sake of convenience, these are tabulated herein with their chemical structure or specifications further amplified so that any of these components can be readily obtainable or made by those of ordinary skill in the art.

| Ingredient Designation | Supplier and Chemical Description |
|---|---|
| POLYOLS | |
| NIAX E474 | Union Carbide: Polyether Triol Hydroxyl No. 28 |
| POLY G55-28 | Olin Chem: Polyether Diol Hydroxyl No. 28 |
| DALTOREZ 2360 | ICI Americas: Polyester polyol |
| ISOCYANATES | |
| VMO 22 | ICI Americas: MDI based polyurethane polyether prepolymer 23% - NCO: Functionality = 2 |
| XI-192 | ICI Americas: MDI based polyurethane polyether prepolymer 27.5% - NCO: Functionality = 2.2 |
| ES-12 | ICI Americas: MDI based polyurethane polyester prepolymer 18.7% - NCO: Functionality = 2.02 |
| ES-76 | ICI Americas: MDI based polyurethane polyether prepolymer 21.9% - NCO: Functionality = 2.04 |
| VM-30 | ICI Americas: MDI based polyurethane polyether prepolymer 28.5% - NCO: Functionality = 2.3 |
| E-2150 | ICIA MDI prep. - NCO NCO 24.2 functionality = 2.2 |
| LF-179 | ICI Americas: MDI based polyurethane polyether prepolymer 23% - NCO: Functionality = 2 |
| E-IMR | Mold Release Agents Goldschmidt-Mold Release. Fillers & Pigments |
| PD1-4803 | Carbon black in Triol |
| Catalysts | |

| Ingredient Designation | Supplier and Chemical Description |
|---|---|
| FORMREZ UL-1 | Air Products: Dibutyl Tin Mercaptide |
| DABCO - S-25 | Air Products: Triethylene Diamine |
| Surfactants | |
| A-1100 | Union Carbide: Gamma-aminopropyl-triethoxy silane |
| DC-190 | Air Products: Silicone surfactant |

The polyurethanes may be formulated and shaped into moulded objects by casting methods conventionally known in the art, generally involving the use of a casting machine. Examples of low pressure casting machines include those offered commercially by Klockner Ferromatik Dema, Inc., Erlander, Ky., including the DS 30/30 and PSA 91, while high pressure models including machines made by Cannon Corp. may also be used in the Examples of this invention.

In the casting process, the polyisocyanate is referred to as the "A" component and the mixture of active hydrogen-containing compounds are referred to as the "B" component. If additives are employed they are generally incorporated into the "B" component, although they may also be added in the "A" component so long as they are not isocyanate-reactive. The "B" component mixture, including additives, may be blended or agitated in a suitable container or supply tank, generally at ambient temperature, although temperatures up to about 75° C. may be employed. Agitation can be conducted using conventional propoeller type stirrers (generally supplied by the casting machine manufacturer) at RPM's of several hundred at most.

The "A" and "B" components are placed in separate containers, which are generally equipped with agitators, of the casting machine wherein the temperature of each component is ambient to 70° C. Molded polyurethane products are made by conducting each component via suitable metering pumps, to a mixing head where the components are mixed under low pressures, generally pressures less than 30 bar, preferably less than 20 bar. The mixed components can then be poured or injected into a mold.

Once a desirable mold shape has been filled, the mold is closed and curing is effected. Generally curing temperatures of about 30° C. to about 60° C. can be used. Curing (as reflected by demold times) requires about 1 to 30 minutes, usually about 3 to 10 minutes. This cure time is ample to allow mixing, foaming if desired, and mold filling, yet sufficiently rapid to allow high rates of production.

The reaction of the "A" component and "B" component to make the moulded polyurethanes is carried out at an isocyanate index between about 0.90 and about 1.15, preferably between about 0.95 and about 1.10. Most preferably, the reaction is carried out at an isocyanate index substantially equal to 1 when based on total active hydrogens available including the water reaction.

The practice of the invention can be better understood by referring to the following nonlimiting examples where all portions are expressed on a weight basis unless otherwise noted:

EXAMPLES 1–3

To demonstrate the preparation of microcellular foams employing different isocyanates with barium sulfate and water as the generator for $CO_2$ the following general procedure was carried out:

Examples 1, 3 and A, B were generated on a low pressure machine, DS 30/30 of Klockner Ferromatik Desma, and Example 2, high pressure machine, FPL 10 of Cannon.

For comparative purposes Examples A and B employing reactive proportions and conditions similar to that for Example 3 were carried out to demonstrate the properties obtained by the use of water without the barium sulfate salt and the use of chlorofluorocarbon "CFC-11" as the sole source of blowing agent without water and salt.

Proportions of reactants and the physical properties obtained are shown in Table 1.

TABLE 1

|  | Examples | | | | |
|---|---|---|---|---|---|
|  | 1 | 2 | 3 | A | B |
|  | Ingredients (parts by weight) | | | | |
| "A" Component | | | | | |
| VMO22 | 47.5 | | | | |
| LF 179 | | | | | |
| ES 76 | | 61.8 | 58 | 57.8 | 51 |
| "B" Component | | | | | |
| NIAX E474 | 28.4 | 100 | 100 | 100 | 100 |
| Polyol G-55-28 | 64.0 | | | | |
| 1-4 Butane Diol | 7.26 | 8.0 | 8.0 | 8.0 | 8.0 |
| DABCO-S-25 | 1.2 | 1.2 | 1.2 | 1.2 | 1.5 |
| FORMREZ UL-1 | 0.15 | 0.1 | 0.05 | 0.05 | 0.05 |
| DC-190 | 0.10 | | | | |
| E-IMR | 1.00 | | | | |
| PIGMENT | 1.5 | 1.5 | 1.5 | 1.5 | 1.5 |
| $BaSO_4$ | 4.0 | 4.0 | 4.0 | | |
| Water | 0.25 | 0.43 | 0.43 | 0.43 | (8 CFC-11) |
| A-1100 | | 0.1 | 0.1 | 0.1 | 0.1 |
| A/B (Wt. Ratio) | 0.44 | 0.536 | 0.5 | 0.52 | 0.428 |
| Physical Properties | | | | | |
| Density, g/cc | | | | | |
| Overall | .55 | .55 | 0.48 | 0.48 | 0.48 |
| Skin | | | 0.81 | 0.65 | 0.80 |
| Core | | | 0.45 | 0.45 | 0.45 |
| Ratio of Skin/Core Density | | | 1.80 | 1.59 | 1.70 |
| Hardness, SHORE A | | | | | |
| Skin | 55 | 59 | 59 | 50 | 55 |
| Core | 22–25 | 28 | 28 | 28 | 12 |
| Ratio of Skin/Core Hardness | | | 2.11 | 1.79 | 4.58 |
| Tensile, (psi) | | | | | |
| Skin | 519 | 310 | 626 | 390 | 394 |
| Core | | 210 | 301 | 204 | 216 |
| Ratio of Skin/Core Tensile | | | 2.08 | 1.91 | 1.82 |
| Elongation, % (Overall) | 462 | | | | |
| Skin | — | 290 | 213 | 188 | 173 |
| Core | — | 200 | 199 | 180 | 159 |
| Ratio of Skin/Core Elongation | | | 1.07 | 1.04 | 1.09 |
| Tear, (Die C.) PLI | | | | | |
| Skin | | 48 | 95.6 | 75.9 | 62.2 |
| Core | | 28 | 37.1 | 34 | 33.7 |
| Ratio of Skin/Core Tear | | | 2.58 | 2.23 | 1.84 |
| ROSS Flex, | | | | | |
| Room T. | 50 | | | | |
| 0° C. | 50 | | | | |
| BATA Flex, KCS | 50 | | | | |
| TABOR Abrasion Loss (mg/KCS) | 200 | 100 | | | |

EXAMPLE 4

In order to demonstrate the operation of the invention employing high pressure mixing equipment the following procedure was carried out:

A and B components streams are supplied to an impingement mixing head at preselected mixing ratios by setting individual metering pumps at typical mixing pressures ranging from 100-150 bars. The mixing head effluent is then injected directly into a closed mold and permitted to cure for 2.5 minutes and thereafter demoulded and trimmed.

Operating conditions and proportions of ingredients are listed in Table 2.

TABLE 2

|  | Example 4 (parts by weight) | |
|---|---|---|
| "A" Component | | |
| ES 73 | 44.5 | — |
| ES 76 | — | 50 |
| "B" Component | 100 | 100 |
| NIAX-E474 | 28.4 | 80 |
| Poly G-55-28 | 64.0 | 20 |
| 1,4-Butane Diol | 7.26 | 7.35 |
| DABCO-S25 | 1.2 | 1.40 |
| FOMREZ UL-1 | 0.15 | 0.03 |
| PDI 4803 | 4.00 | 1.50 |
| Water | 0.25 | 0.50 |
| $BaSO_4$ | 4.00 | Add |
| Operating Conditions | Piston Pump | Metering Pump |
| Output (gm/sec) | 500 | 230 |
| A/B Weight Ratio | 0.445 | 0.5 |
| Mixing Pressure A/B psi | 1800/1800 | 2200/2200 |
| Temperature A/B° C. | 45/45 | 45/45 |
| Mold Temp. °C. | 50 | 50 |
| Demold Time (sec) | 210 | 180 |
| Oriface Opening A/B (mm) | 1/2 | 2.5/3 |

EXAMPLE 5

In order to demonstrate the effect of the water/barium sulfate concentration on the formation of microcellular integral skin foams, the water concentration and the barium sulfate concentration in the "B"-component described in Table 3 was varied. These examples are labeled a to h. Skin formation was labeled good when a nonporous dense surface skin measuring about 0.5 mm in thickness is attached to a outer skin area measuring from about 15–20 microns. It appears that where the $BaSO_4/H_2O$ weight ratio ranges from 0.01–1.0 and for total salt concentrations ranging from 5–20 parts by weight products with good skin characteristics are formed.

TABLE 3

|  | Example 5a–5h (parts by weight) | | | | | | | |
|---|---|---|---|---|---|---|---|---|
| "A" Component | (a–h) | | | | | | | |
| ES 73 | 100 | | | | | | | |
| "B" Component | | | | | | | | |
| NIAX E474 | 28.4 | | | | | | | |
| Poly G 55-28 | 64.0 | | | | | | | |
| 1,4-butanediol | 7.26 | | | | | | | |
| DABCO S-25 | 1.2 | | | | | | | |
| FORMREZ UL-1 | 0.15 | | | | | | | |
| PDI 4803 | 2.0 | | | | | | | |
|  | a | b | c | d | e | f | g | h |
| WATER/$BaSO_4$ | 0/0 | 5/5 | 5/10 | 5/20 | 1/5 | 1/10 | 2/5 | 2/20 |
| Skin | N | G | G | G | P | N | N | N |

TABLE 3-continued

| Formation | |
|---|---|
| N = None | |
| G = Good | |
| P = Poor | |

EXAMPLE 6

Hydroxy terminated polyester may be used in combination with chain extenders in the formation of microcellular foams. According to the following procedure a microcellular foam having an excellent skin density and character was prepared.

Hand mixing was employed for preparing the A/B mixture of Table 4. This mixture was cast into a metal mold. The skin quality was good as measured in Example 5 mentioned above.

TABLE 4

| (parts by weight) | |
|---|---|
| "A" Component | |
| ES-12 | 109 |
| "B" Component | |
| DALTOREZ 2360 | 100 |
| Ethylene Glycol | 9 |
| $BaSO_4$ | 4 |
| Water | 0.5 |
| DABCO-EG | 1.2 |
| Pigment-PDI-4803 | 1.5 |
| A/B Ratio | .94 |

EXAMPLE 7

Shoe soles were cast at low pressure employing conventional molding equipment manufactured by Desma DS 30/30 or PSA 91. The ingredient composition and the operating conditions employed are listed in Table 5.

TABLE 5

| Ingredients (parts by weight) | |
|---|---|
| "A" Component | |
| ES 73(A) | 47.3 |
| "B" Component | |
| NIAX E-474 | 34.57 |
| Poly G 55-28 | 51.40 |
| 1-4 butanediol | 6.9 |
| DABCO S-25 | 1.2 |
| $KAl_2(AlSi_3O_{10})(OH)_2$ | 4.0 |
| Formrez UL-1 | 0.05 |
| Water | 0.38 |
| Pigment | 1.5 |
| A/B ratio | 0.473 |
| Operating Conditions | |
| Compound Temp. °C. | |
| "A" and "B" | 35° C. |
| Recirculation Pressure (bars) | |
| "A" Component | 7 |
| "B" Component | 12 |
| Mold Temp. (°C.) | 50° |
| Throughput (gm/sec.) | 65 |
| Demould Time (min.) | 3 |

We claim:

1. Process for the manufacture of a microcellular polyurethane elastomer product having a density in the range of 0.1 to 1.1 $gm/cm^3$ produced by reacting a polyisocyanate, a polyol, a chain extender and a blowing agent, the improvements which comprise employing carbon dioxide gas as the sole source of the blowing agent resulting from the reaction of water with isocyanate in admixture with particulate, non-hydratable inorganic salts, wherein said salts have a solubility in water of less than 0.01 parts per 100 parts of water at 25° C.

2. The method of claim 1 wherein said inorganic salts are selected from the group consisting of metals of Groups IIA, III-A, IV-B, V-B, VI-B, VII-B, and VIII-B, tin, lead, antimony, bismuth and double salts of said metals with metals of Group I of the Periodic Table, wherein said salts have a solubility in water less than 0.01 parts per 100 parts water at 25° C.

3. The method of claim 1 wherein said particulate salts have a particle size in the range of 0.5-1000 microns.

4. The method of claim 1 wherein said salts are selected from the group consisting of $BaSO_4$; $BaCO_3$; $BaCrO_4$; $Ba_3(PO_4)_2$; $BaMoO_4$; $CaF_2$; $PbCrO_4$; $Ag_2CO_3$; $AgCN$; $SrSO_4$; $Ca_3(PO_4)_2$; $MgSiO_3$; $Mg_2SiO_4$; $SrCO_3$; $Sr_2SiO_4$; $KAl_2(AlSi_3O_{10})(OH)_2$ and mica.

5. The method of claim 1 wherein said salts are present in concentrations ranging from 0.5-20 parts by weight based on total resin forming ingredients.

6. The method of claim 1 wherein said salts are selected from the group consisting of barium sulfate, barium carbonate, and mica.

7. A method of claim 1 wherein the weight ratio of the anhydrous salt to total water ranges from 1-100.

8. The method of claim 1 wherein said polyisocyanate is an -NCO terminated polyether or polyester prepolymer made by reacting a diphenylmethane diisocyanate in excess with a polyol and wherein said polyol comprises a polyether polyol having a hydroxy equivalent weight ranging from 750-3000 and a hydroxy functionality of 2-3 and wherein said chain extender has a molecular weight below 500 and hydroxyl groups and/or hydrogen containing amino groups.

9. A closed cell microcellular polyurethane elastomer characterized by a nonporous, nonpeelable skin attached to a dense microcellular foam outer surface area ranging in thickness from 0.5-3 mm attached to a microcellular foam core, wherein the pore diameter in said outer area ranges from 15-50 microns and in said core area ranges from 30-80 microns.

10. An isocyanate reactive composition comprising (1) an inorganic metal salt selected from the group consisting of $BaSO_4$; $BaCO_3$; $BaCrO_4$; $Ba_3(PO_4)_2$; $BaMoO_4$; $CaF_2$; $PbCrO_4$; $Ag_2CO_3$; $AgCN$; $SrSO_4$; $Ca_3(PO_4)_2$; $MgSiO_3$; $Mg_2SiO_4$; $SrCO_3$; $Sr_2SiO_4$; $KAl_2(AlSi_3O_{10})(OH)_2$ and mica and (2) water wherein the weight ratio of the salt to total water ranges from 1-100.

11. The method of claim 4, wherein said salt is $BaSo_4$.

12. The method of claim 4, wherein said salt is $KAl_2(AlSi_3O_{10})(OH)_2$.